United States Patent [19]

Taguchi

[11] Patent Number: 5,566,223
[45] Date of Patent: Oct. 15, 1996

[54] COMMUNICATIONS SYSTEM HAVING A HOST EXCHANGE AND A MATE EXCHANGE AND A METHOD FOR MANAGING MAINTENANCE STATE OF SUBSCRIBER ACCOMMODATED IN THE MATE EXCHANGE

[75] Inventor: Shinichi Taguchi, Kawasaki, Japan

[73] Assignee: Fujitsu Limited, Kanagawa, Japan

[21] Appl. No.: 139,577

[22] Filed: Oct. 20, 1993

[30] Foreign Application Priority Data

Oct. 22, 1992 [JP] Japan ..................................... 4-283343

[51] Int. Cl.[6] ............................. H04M 1/24; H04M 3/08; H04M 3/22; H04J 1/16
[52] U.S. Cl. ................................. 379/34; 379/10; 379/14; 370/13
[58] Field of Search .................................... 379/1, 10, 14, 379/34, 32, 229, 225; 375/27, 29; 370/13, 14, 15

[56] References Cited

U.S. PATENT DOCUMENTS 4,922,515  5/1990  Simpson, Jr. ........................ 379/34 X
5,083,308  1/1992  Gaulke et al. ............................ 379/34
5,166,925  11/1992  Ward ..................................... 379/27 X
5,249,222  9/1993  Pinard .................................. 379/229 X

*Primary Examiner*—Wellington Chin
*Assistant Examiner*—Paul Loomis

[57] ABSTRACT

A communications system includes a host-exchange system having a host exchange, a mate-exchange system having a mate exchange accommodating a mate-exchange subscriber terminal, and a communications medium connecting the host-exchange system and the mate-exchange system together. The mate-exchange system includes a first unit for collecting maintenance information as to whether or not the mate-exchange subscriber terminal is operable, and a second unit for sending the maintenance information to the host-exchange system via a transmission range allotted to the mate-exchange subscriber terminal on the communications medium. The host-exchange system includes a third unit for monitoring a state of the mate-exchange subscriber terminal on the basis of the maintenance information from the second unit and for controlling a call addressed to the mate-exchange subscriber terminal.

16 Claims, 7 Drawing Sheets

FIG. 2

(1) FRAME STRUCTURE ON DIGITAL MULTIPLEXED TRANSMISSION PATH

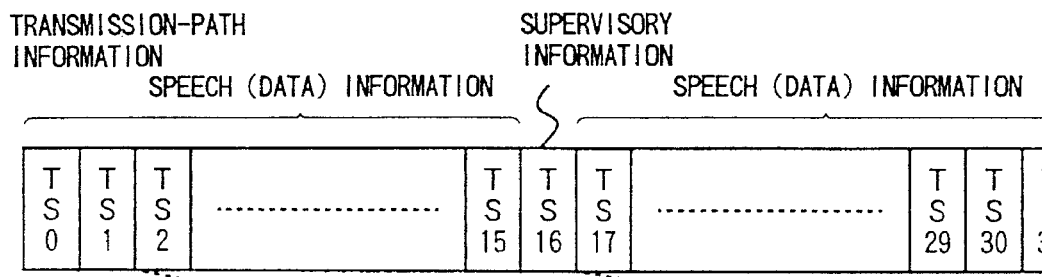

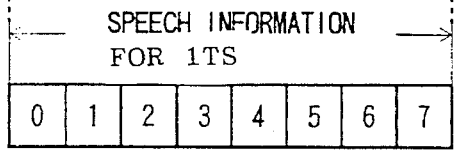

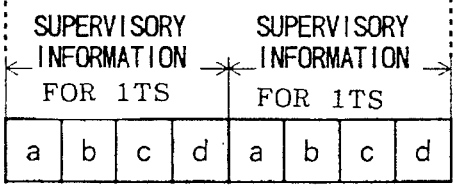

(4) BIT STRUCTURE OF SUPERVISORY INFORMATION

| STATE OF SUBSCRIBER CIRCUIT | a | b | c | d |
|---|---|---|---|---|
| IDLE (ON-HOOK STATE) | 1 | 1 | 1 | 1 |
| CALLING (OFF-HOOK STATE) | 0 | 1 | 1 | 1 |
| DIALING (ON/OFF INTERMITTENCE) | X | 1 | 1 | 1 |
| IN TALKING (OFF-HOOK STATE) | 0 | 1 | 1 | 1 |
| RECEIVING RINGING SIGNAL (ON-HOOK STATE) | 1 | 1 | 1 | 1 |

X : ALTERNATELY 1/0

(5) BIT STRUCTURE OF MAINTENANCE INFORMATION

| STATE OF PART REGARDING SUBSCRIBER | a | b | c | d |
|---|---|---|---|---|
| NORMAL | 1 | 1 | 1 | 1 |
| FAULT HAS OCCURRED | 1 | 1 | 0 | 1 |
| BLOCKED | 1 | 1 | 1 | 0 |
| OTHERS | 1 | 1 | 0 | 0 |

COMMUNICATIONS SYSTEM HAVING A HOST EXCHANGE AND A MATE EXCHANGE AND A METHOD FOR MANAGING MAINTENANCE STATE OF SUBSCRIBER ACCOMMODATED IN THE MATE EXCHANGE

BACKGROUND OF THE INVENTION

1. Field of the Invention

The present invention generally relates to a communications system having a host exchange and a mate or remote exchange and a method for managing subscriber terminals connected to the remote exchange by the host exchange.

2. Background of the Invention

As a telephone communications service, the communications a subscriber circuit accommodated in a remote exchange is available in which subscriber terminals physically accommodated in the remote exchange are handled as if these subscriber terminals are accommodated in a host exchange coupled to the remote exchange. Hereinafter, subscriber terminals accommodated in a remote exchange are referred to as remote-exchange subscriber terminals. The host exchange manages the same subscriber data and accounting data regarding the remote-exchange subscriber terminals to which the above communications service is provided as if these remote-exchange subscriber terminals are accommodated in the host exchange. Control information concerning the subscriber terminals accommodated in the remote exchange, for example, ON-hook/OFF-hook information is directly transmitted from that exchange to the host exchange via a leased communications line connected between the remote exchange subscriber terminal and the host exchange.

In the above-mentioned manner, the host exchange is capable of handling the subscriber terminals accomodated in the remote exchange as if the subscriber terminals are accommodated in the host exchange.

Conventionally, the host exchange is not informed of a fault occurring in, for example, a subscriber circuit connected between the remote exchange and a remote-exchange subscriber terminal. Further, the host exchange is not informed that a remote-exchange subscriber terminal is maintained in a blocked state in order to, for example, exchange the defective subscriber circuit to which the above remote-exchange subscriber terminal is connected with a new circuit. Since the host exchange is not informed of the above maintenance information, the host exchange cannot detect the situation in which the remote-exchange subscriber terminal is not operable.

SUMMARY OF THE INVENTION

It is an object of the present invention to provide a communications system having a host exchange and a remote exchange and a managing method in maintenance state of subscriber accommodated in the remote exchange, wherein the host exchange is capable of always supervising the states of the subscriber terminals in order to eliminate the above-mentioned disadvantages.

The above object of the present invention is achieved by a communications system comprising:

a host-exchange system having a host exchange;

a remote-exchange system having a mate exchange accommodating a remote-exchange subscriber terminal; and a communications medium connecting the host-exchange system and the remote-exchange system together, the remote-exchange system comprising:

first means for collecting maintenance information to determine whether or not the remote-exchange subscriber terminal is operable; and second means for sending the maintenance information to the host-exchange system via a transmission range allotted to the remote-exchange subscriber terminal on the communications medium, the host-exchange system comprising third means for monitoring a state of the remote-exchange subscriber terminal on the basis of the maintenance information from the second means and for controlling a call addressed to the remote-exchange subscriber terminal.

The above object of the present invention is also achieved by a method for managing a remote-exchange subscriber terminal accommodated in a remote exchange of a remote-exchange system connected to a host exchange of a host-exchange system via a communications medium, the method comprising:

(a) collecting, in the remote-exchange system, maintenance information as to whether or not the remote-exchange subscriber terminal is operable;

(b) sending the maintenance information to the host-exchange system via a transmission range or field allotted to the remote-exchange subscriber terminal on the communications medium;

(c) monitoring, in the host-exchange system, a state of the remote-exchange subscriber terminal on the basis of the maintenance information; and (d) controlling, in the host-exchange system, a call addressed to the remote-exchange subscriber terminal.

BRIEF DESCRIPTION OF THE DRAWINGS

Other objects, features and advantages of the present invention will become more apparent from the following detailed description when read in conjunction with the accompanying drawings in which:

FIG. 2 is a diagram showing supervisory/maintenance information used in an embodiment of the present invention;

DESCRIPTION OF THE PREFERRED EMBODIMENTS

A description will now be given, with reference to FIGS. 1A and 1B, of a communications system having a host exchange and a mate exchange.

Figure 1A:
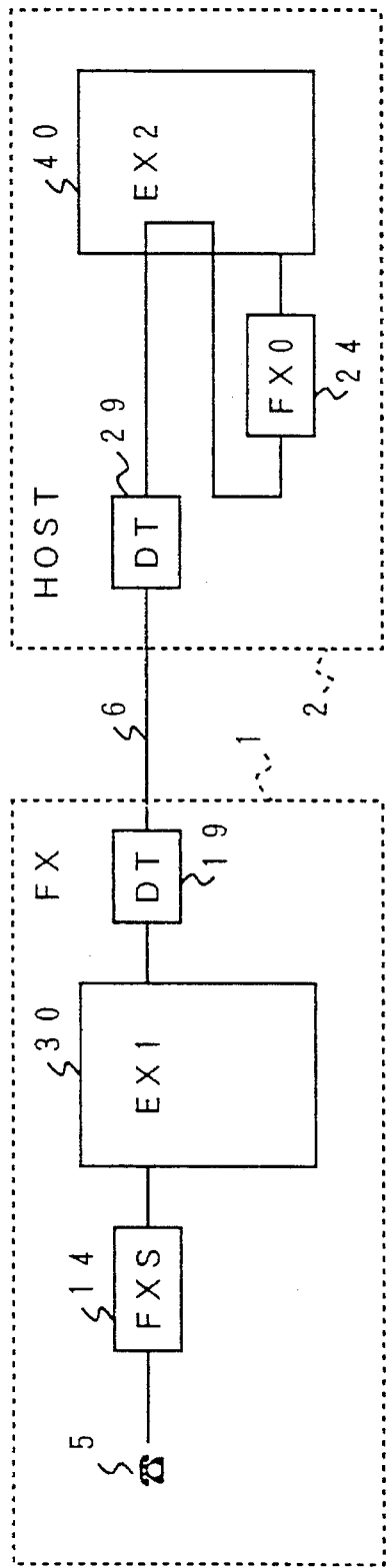
FIG. 1A is a block diagram of a communications system having a host-exchange system and a remote-exchange system.

A communications system shown in FIG. 1A is made up of a mate-exchange or remote-exchange system 1, a host-exchange system 2, and a leased communications line 6 permanently connecting the mate-exchange or remote-exchange system 1 and the host-exchange system 2 together. A mate-exchange or remote-exchange (FX) subscriber terminal 5 is coupled to a mate or remote exchange (EX1) 30 via a mate-exchange or remote-exchange subscriber circuit (FXS) 14. In actuality, the remote-exchange subscriber circuit 14 is included in the remote exchange 30, but the circuit 14 is illustrated separately from the exchange 30 in FIG. 1A.

The leased communications line 6 is a logical leased line, in which a part of a digital multiplexed transmission path is permanently used by the remote-exchange subscriber terminal 5. Such a digital multiplexed transmission path is known, as shown in parts (1) and (2) of FIG. 2, in which 32 time slots (TS), each consisting of eight bits, are multiplexed to thereby form a frame. In this case, the bit rate of the multiplexed transmission path is equal to 2 Mbits/second.

As shown in parts (1) and (2) of FIG. 2, 30 time slots TS1–TS15 and TS17–TS31 among the 32 multiplexed time slots of the digital transmission path are used to transmit speech or data information (hereinafter simply referred to as data) with a bit rate of 64 kbits/second, time slot TS0 is used to transmit information concerning the multiplexed transmission path, and time slot TS16 is used to transmit supervisory information or control information concerning the above 30 time slots. The supervisory information is information transmitted from the subscribers to the exchange in order to notify the exchange of the states of subscribers. Generally, such supervisory information is also called SCN information. The control information is information transmitted from the exchange to the subscribers, such as ringing signal information. Generally, such control information is also called SD information. The present invention is not directly concerned with the control information. Hence, the supervisory information will now be described in detail.

As shown in parts (3) and (4) of FIG. 2, the supervisory information consists of four bits associated with each time slot of speech information. A range or field in which the supervisory information is placed (hereinafter such a range is referred to as a supervisory information transmission range) can occupy, per frame, two time slots of speech information within time slot TS16. Hence, as is known, a multiframe format is employed in order to transmit supervisory information concerning all 30 time slots.

The above-mentioned logical leased line means that the remote-exchange subscriber circuit 14 permanently uses one time slot of speech information and the corresponding supervisory information transmission range (four bits) shown in parts (1) through (3) of FIG. 2. In the above-mentioned system configuration, the speech path (used to transmit speech information) of the mate-exchange or remote-exchange subscriber terminal 5 is permanently connected to an exclusive time slot via the exchange 30 and digital termination equipment (DT) 19. In this state, when the remote-exchange subscriber terminal 5 is switched to the off-hook state, the exchange 30 sends supervisory information indicating that the remote-exchange subscriber terminal 5 has been switched to the off-hook state in the supervisory information transmission field corresponding to the exclusive time slot.

The exclusive time slot is permanently connected to a mate-exchange or remote-exchange subscriber circuit or trunk (FX0) 24 connected to a host exchange (EX2) 40 of the host-exchange system 2. Although not shown, subscriber circuits connected to subscriber terminals accommodated in the host-exchange system 2 are connected to the exchange 40. Hereinafter, the remote-exchange subscriber circuit 24 is referred to as a remote-exchange trunk in order to distinguish it from other subscriber circuits connected to subscriber terminals accommodated in the system 2.

When the remote-exchange subscriber terminal 5 is switched to the off-hook state, the host exchange 40 detects the above off-hook state as if a subscriber terminal directly connected to the remote-exchange subscriber circuit 24 is switched to the off-hook state. Then, the host exchange 40 receives a selection (dial) signal contained in the supervisory information (in a case where a pulse dial is used) or the speech information (in a case where push-button (DTMF) signal is used), and performs a connecting process in the same manner as in a case where a dial signal from a subscriber terminal accommodated in the host-exchange system 2 is received.

Figure 1B:
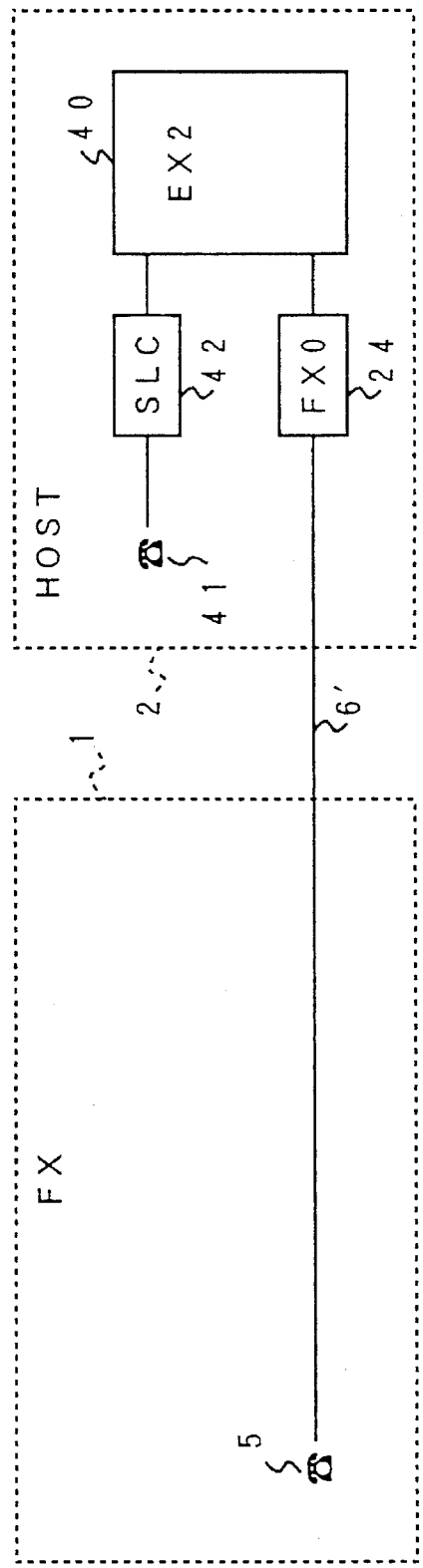
FIG. 1B is a block diagram showing an equivalent relay system of the system shown in FIG. 1A.

FIG. 1B schematically shows an equivalent relay system of the system shown in FIG. 1A. As shown in FIG. 1B, the remote-exchange subscriber terminal 5 corresponds to a subscriber accommodated in the subscriber circuit 24 of the host-exchange system 2. That is, the configuration shown in FIG. 1A is equivalent to a configuration in which a subscriber accommodated in the host-exchange system 2 is connected to the host exchange 40 via a subscriber circuit (SLC) 42. That is, a communication line 6' between the remote-exchange subscriber terminal 5 and the subscriber circuit 24 is not a relay line when viewing the line 6' from the exchange 40 of the host-exchange system 2, but corresponds to a subscriber line connected to the remote-exchange subscriber terminal 5. In this regard, the line 6' connected to the subscriber circuit 24 is also called a remote-exchange (FX) line.

However, the subscriber circuit 24 does not operate in the exactly the same manner as the subscriber circuit 42. For example, if a fault has occurred in the subscriber circuit 42 of the host-exchange system 2, a processor (not shown for the sake of simplicity) of the host exchange 40 detects the fault during the connection process, for example. The above processor controls a switch (not shown) and other circuits of the remote-exchange system 2. Then, the above processor informs, in the form of a talkie (voice) announcement or the like, the calling terminal that a connection to the called terminal is impossible, and stores information concerning the detected fault. Thereafter, if the terminal connected to the defective subscriber circuit 42 is called, the processor does not connect the calling terminal to the called terminal, and instead sends the talkie announcement to the calling terminal. Information concerning the fault is displayed on a maintenance console (not shown) of the host exchange 40 and a maintenance person is notified that a fault-has occurred in the subscriber circuit 42.

Normally, the subscriber circuit 42 and the trunk 24 are packaged. In actuality, a plurality of subscriber circuits are accommodated. If the package accommodating the subscriber circuit 42 is replaced with a new one because a fault has occurred therein, a blocking process is carried out for other normal subscriber circuits by means of the maintenance console in order to block calls addressed to subscriber terminals connected to these normal subscriber circuits. Information concerning the above blocking is sent to the processor of the host exchange 40, which sends a busy tone signal or the like to a calling terminal which is calling a subscriber accommodated in the package which is out of a shelf accommodating packages.

If a fault has occurred in the mate-exchange circuit 14 of the mate exchange 30 to which the mate-exchange subscriber terminal 5 is connected, the exchange 30 detects the fault. If the remote-exchange system 1 is a manned system, information concerning the fault is displayed on a maintenance console (not shown) of the exchange 30. If the remote-exchange system 1 is an unmanned system, information concerning the fault is displayed on a system for performing remote control of the remote-exchange system.

In the system shown in FIGS. 1A and 1B, the host exchange 40 of the host-exchange system 2 (more particularly, the processor thereof) is not informed that a connection to the remote-exchange subscriber system is not available. Further, the host exchange 40 (more particularly, the processor thereof) is not informed that the subscriber circuits accommodated in a package which has been detached from the shelf are in the blocked state. Furthermore, if a fault has occurred in the digital multiplexed transmission path 6 or the digital termination equipment 19, the host exchange 40 (more particularly, the processor thereof) is not informed that the trunk 24 is substantially inoperable even if information concerning the above fault is sent to the remote-exchange system 1 and/or the host-exchange system 2.

Hence, if a call addressed to the remote-exchange subscriber terminal 5 is received by the host exchange 40 in the above-mentioned state in which it is not substantially accessible, the host exchange 40 attempts to make a connection with the trunk 24 and send a ringing signal thereto because the host exchange 40 is not informed that a connection to the terminal 5 is impossible. In this case, no response will be returned to the calling terminal, and hence the caller will abandon the call.

Further, since the host-exchange system 2 cannot automatically detect the state in which a connection to the remote-exchange subscriber terminal 5 is impossible, no process is carried out in the host-exchange system 2 until the system 2 is informed that the subscriber terminal 5 is inaccessible by the maintenance operator of the remote-exchange system 1 or the remote control system. Hence, the communications services are degraded.

The present invention is intended to eliminate the above disadvantages.

Figure 3:
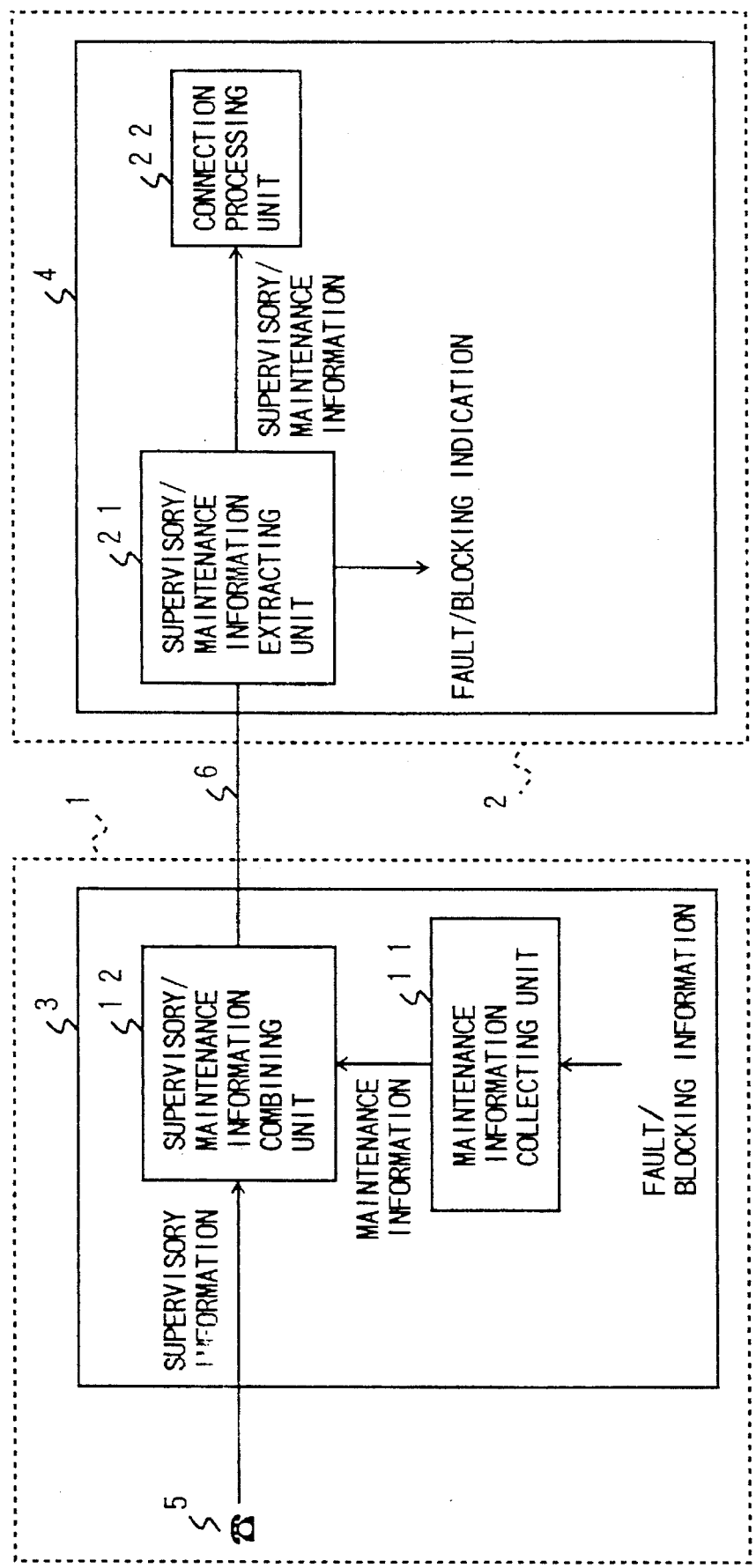
FIG. 3 is a block diagram of a communications system according to the embodiment of the present invention.

A description will now be given of an embodiment of the present invention. FIG. 3 shows an outline of the embodiment of the present invention. In FIG. 3, parts that have the same names as those shown in the previously described are given the same reference numbers as previously. A system shown in FIG. 3 includes the remote exchange system 1 including a remote exchange system 3, and the host exchange 2 including a host exchange 4. The remote exchange 3 includes a maintenance information collecting unit 11, and a supervisory/maintenance information combining unit 12. The host exchange 4 includes a supervisory/maintenance information extracting unit 21 and a connection processing unit 22. Another exchange system (not shown) may be connected to the host-exchange system 2.

The maintenance information collecting unit 11 collects, as maintenance information, information concerning a fault that has occurred in the remote-exchange subscriber terminal 5 and blocking thereof. The supervisory/maintenance information combining unit 12 combines the maintenance information collected by the unit 11 with supervisory information concerning the remote-exchange subscriber terminal 5, and outputs combined supervisory/maintenance information to the aforementioned supervisory information transmission range allotted to the subscriber terminal 5 on the digital multiplexed transmission path 6. The supervisory/maintenance information extracting unit 21 provided in the host exchange 4 extracts the supervisory/maintenance information from received information, and sends the extracted supervisory/maintenance information to the connection processing unit 22. The connection processing unit 22 performs a connection process in accordance with the received supervisory/maintenance information.

If a fault has occurred in a facility regarding the remote-exchange subscriber terminal 5 or the blocked state of the terminal 5 has occurred, the maintenance information collecting unit 11 collects, as maintenance information, information concerning the fault of the blocked state. The maintenance information collected by the unit 11 is sent to the supervisory/maintenance information combining unit 12, which combines the received information with the supervisory information concerning the subscriber terminal 5 to thereby generate supervisory/maintenance information. This supervisory/maintenance information is sent to the host-exchange system 2 using the supervisory information transmission range allotted to the subscriber 5 on the digital multiplexed transmission path 6.

The supervisory/maintenance information extracting unit 21 extracts the transmitted supervisory/maintenance information from the supervisory information transmission range, and outputs the extracted information to the connection processing unit 22. Further, the unit 21 externally displays information concerning the fault of the terminal 5 or the blocked state thereof.

The connection processing unit 22 stores the information from the unit 21. Further, if a call addressed to the terminal 5 is received, the unit 22 informs the calling terminal that a connection to the called subscriber terminal 5 cannot be made. That is, the host exchange 4 always detects whether or not a fault occurs in the terminal 5 and whether or not the terminal 5 is switched to the blocked state, and can perform an appropriate process for a call addressed to the terminal 5 when a fault or the blocked state is detected. Further, information concerning the detected fault or blocked state is externally displayed on the host exchange 4, and hence an appropriate process for the terminal 5 can be carried out by the maintenance person.

Figure 4:
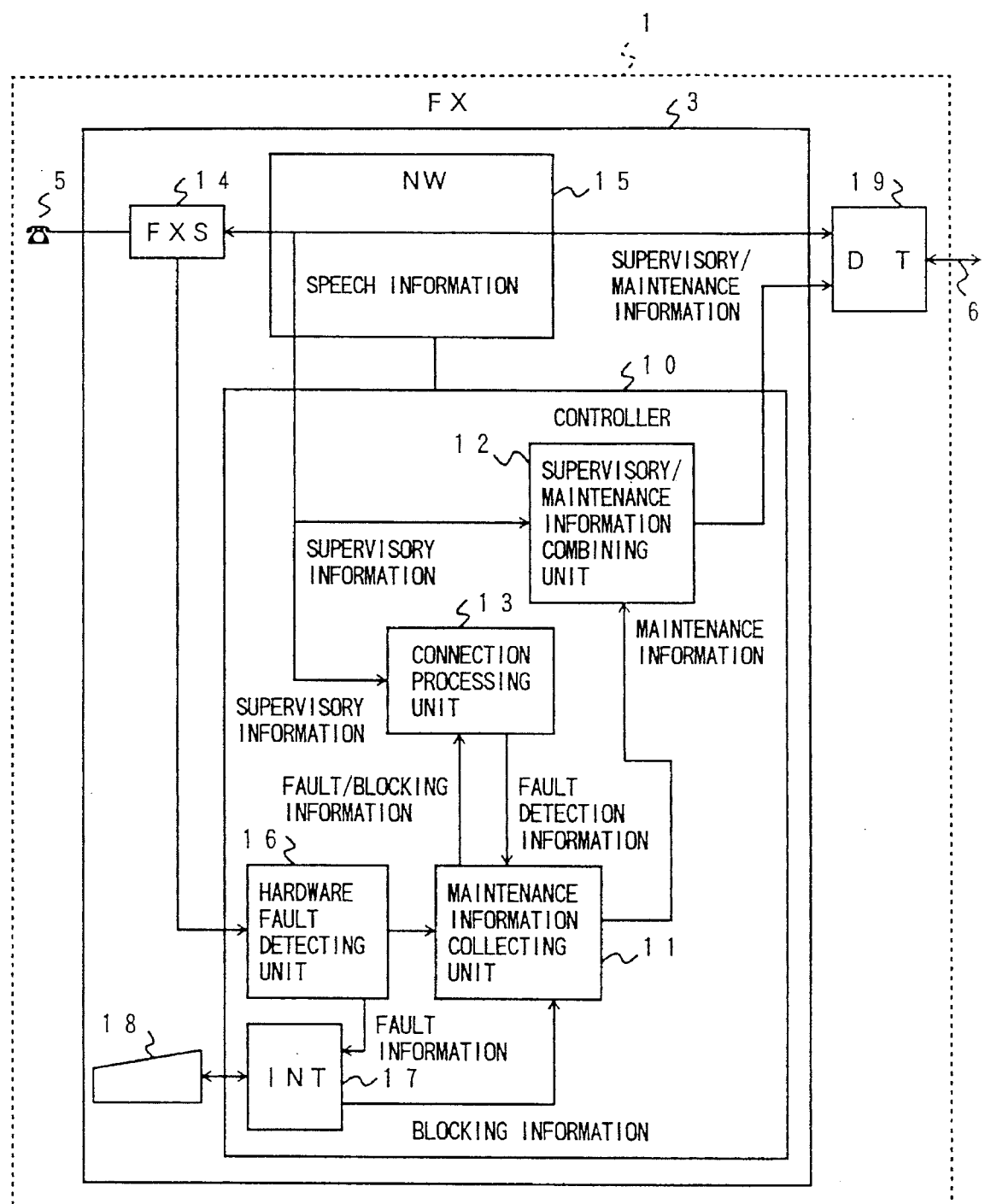
FIG. 4 is a block diagram of a remote-exchange system shown in FIG. 3.

FIG. 4 is a block diagram of the structure of the remote-exchange system 1 shown in FIG. 3. The system 1 comprises the remote-exchange subscriber terminal 5, the remote exchange 3 and the digital termination equipment (DT) 19. In actuality, a plurality of remote-exchange subscriber terminals 5 are connected to the remote exchange 3.

The remote exchange 3 shown in FIG. 4 is made up of a controller 10, a remote-exchange subscriber circuit (FXS) 14, a communications path network 15 and a maintenance console 18. The controller 10 comprises the above-mentioned maintenance information collecting unit 11, the supervisory/maintenance information combining unit 12, a connection processing unit 13, a hardware fault detection unit 16, a maintenance interface 17. In actuality, the controller 10 includes a processor and a memory, and performs other processes for controlling the entire operation.

Figure 5:
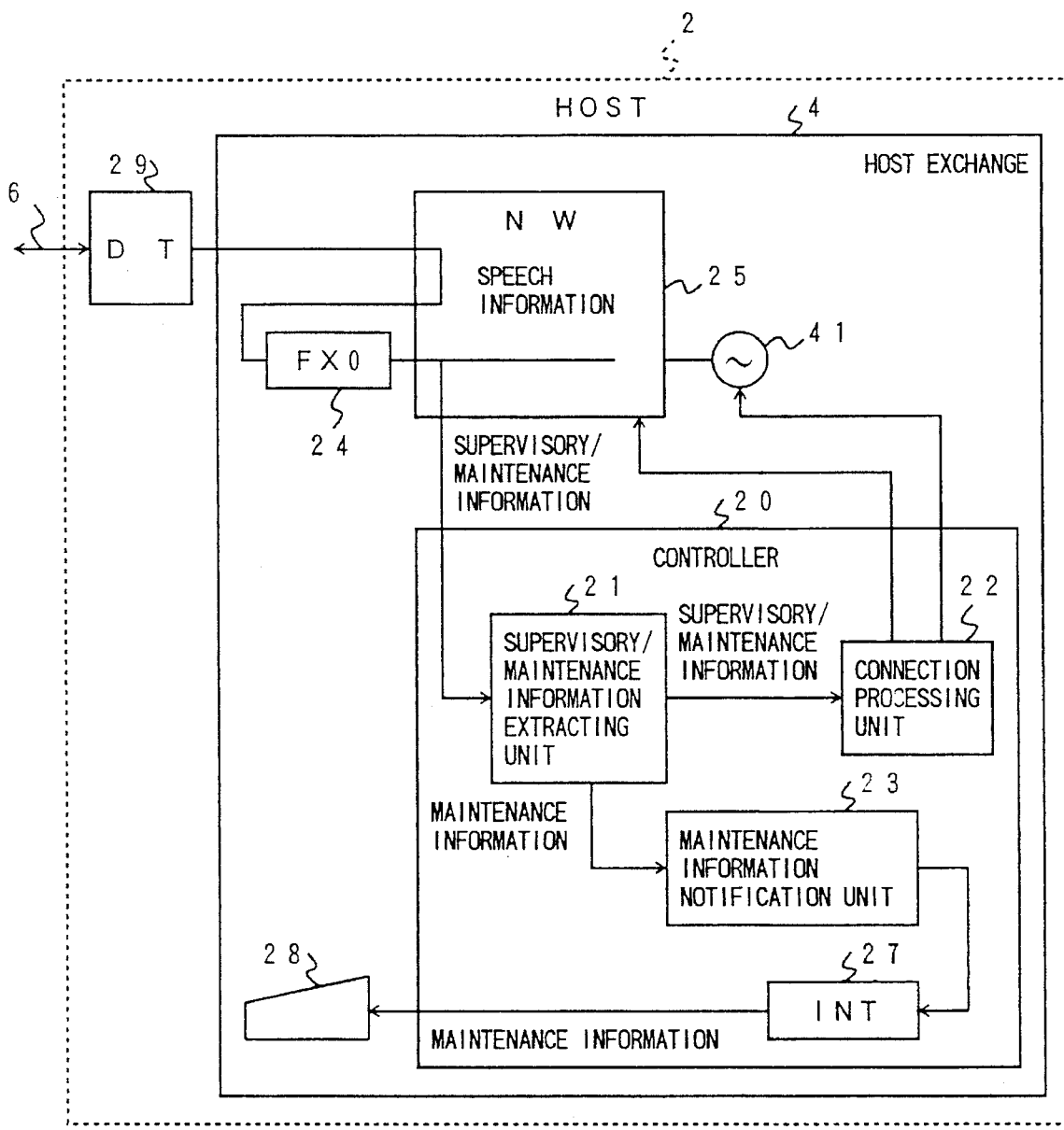
FIG. 5 is a block diagram of a host-exchange system shown in FIG. 3.

FIG. 5 is a block diagram of the structure of the host-exchange system 2 shown in FIG. 3. The system 2 comprises the host exchange 4, a maintenance console 28 and digital termination equipment (DT) 29 connected to the digital termination equipment 19 via the digital multiplexed transmission path 6. The host exchange 4 is made up of a controller 20, the remote-exchange trunk 24 and a communications path network 25. The controller 20 comprises the aforementioned supervisory/maintenance information extracting unit 21, the connection processing unit 22, a maintenance information notification unit 23, and a maintenance interface 27. In actuality, the controller 20 includes a processor and a memory, and performs other processes for controlling the entire operation.

A description will now be given, with reference to FIGS. 6 and 7 in addition to the previously described figures, of the operation of the embodiment of the present invention.

The state of the remote-exchange subscriber terminal 5 is always supervised by the controller 10 of the remote exchange 3. The supervisory information concerning the subscriber terminal 5 is sent to the host exchange of the host-exchange system 2 via the digital multiplexed transmission path 6 at step S1 shown in FIG. 6. As has been described previously, the supervisory information consists of four bits. As indicated in part (4) of FIG. 2, generally, only bit a among the four bits a, b, c and d is used as the supervisory information. If the remote-exchange subscriber terminal 5 is idle (on-hook state), supervisory information in which all four bits a, b, c and d are "1" is sent. If the subscriber terminal 5 is in the off-hook state, only the bit a is set to "0". When a pulse dial signal is sent, the bit a is intermittently switched between "1" and "0" according to the dialed number.

The above supervisory information is multiplexed with speech information by the digital termination equipment 19, and multiplexed information is sent to the digital multiplexed transmission path 6. Then, the multiplexed information is received by the communications path network 25 of the host-exchange system 2 via the digital termination equipment 29. A time slot via which the multiplexed information concerning the subscriber terminal 5 is carried is permanently connected to the trunk 24. The speech information from the trunk 24 is output to the communications path network 25. The supervisory information concerning the subscriber terminal 5 is output to and supervised by the controller 20 of the host exchange 4 (step S11 shown in FIG. 6).

Figure 6:
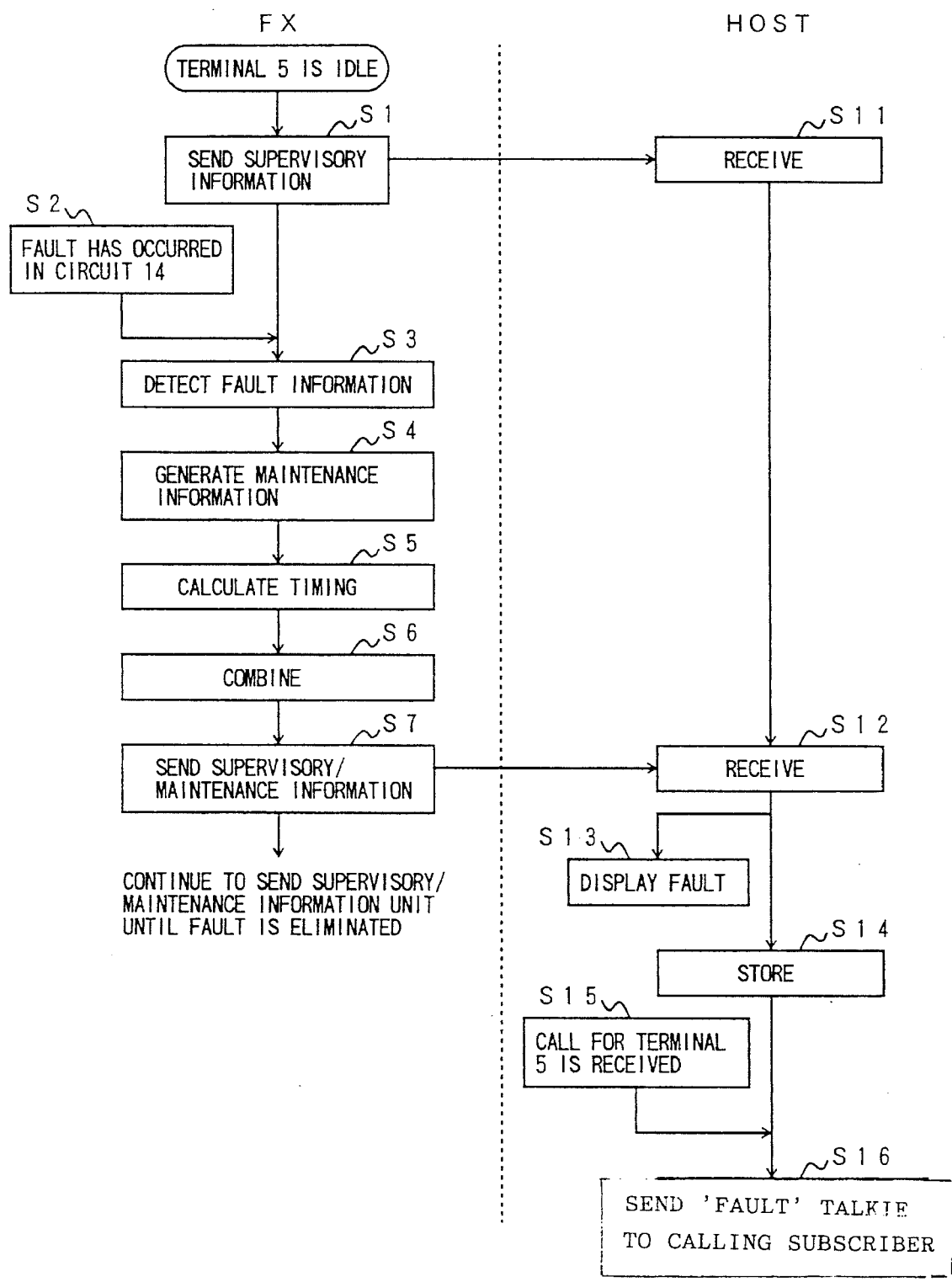
FIG. 6 is a sequence diagram of an operation of the embodiment performed when a fault has occurred in a subscriber circuit.
Figure 7:
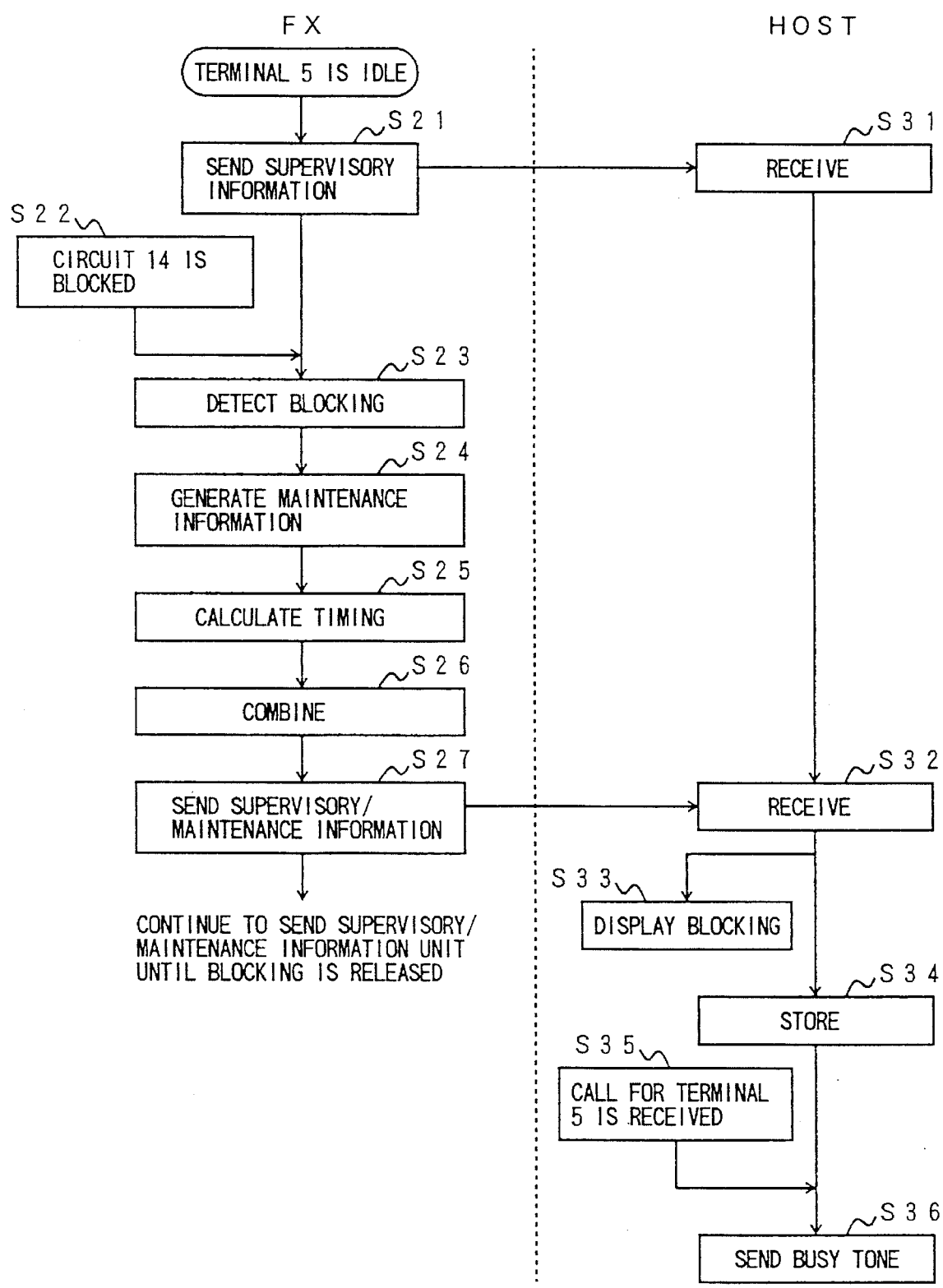
FIG. 7 is a sequence diagram of an operation of the embodiment performed when a remote-exchange subscriber terminal is in a blocked state.

It will now be assumed that a fault has occurred in the remote-exchange subscriber circuit 14 when the subscriber terminal 5 is idle, that is, in the on-hook state (step S2 shown in FIG. 6). As is known, the subscriber terminal 14 generates an error flag by means of built-in hardware when a fault has occurred therein. Generally, a plurality of error flags are provided for respective detectable faults. The hardware fault detection unit 16 receives the error flag and detects a fault in the circuit 14. Then, the unit 18 sends fault information concerning the subscriber circuit 14 to the maintenance information collecting unit 11. If the connection processing unit 13 detects a fault by means of software while performing a connection process to the subscriber terminal 5, the unit 13 informs the maintenance information collecting unit 11 of the detected fault. Normally, a connection process for the subscriber terminal 5 is carried out by the host exchange 4 without using the connection processing unit 13 of the remote exchange 3. In this case, the connection processing unit 13 may not detect a fault.

The maintenance information collecting unit 11 is informed of the fault in the subscriber circuit 14 (step S3), and generates maintenance information (step S4), which consists of four bits shown in part (5) of FIG. 2. In this case, the two high-order bits a and b of the generated maintenance information are set to "1", and the two low-order bits c and d thereof are varied. In part (5) of FIG. 2, the bits c and d are respectively set to "0" and "1" in order to indicate the occurrence of the fault.

In order to output the generated maintenance information to the supervisory information transmission range allotted to the subscriber circuit 14, the maintenance information collecting unit 11 performs the timing of time slot TS16 used to transfer the supervisory information concerning the subscriber circuit 14 (step S5). When the current time corresponds to the calculated timing with which the supervisory information concerning the subscriber circuit 14, the maintenance information collecting unit 11 sends the maintenance information to the supervisory/maintenance combining unit 12, which also receives the supervisory information concerning the subscriber circuit 14.

The supervisory/maintenance information combining unit 12 calculates an AND operation on the supervisory information and the maintenance information (step S6). As has been described previously, the four bits of the supervisory information indicating that the subscriber terminal 5 is idle are "1111", and the four bits of the maintenance information indicating that a fault has occurred are "1101". In this case, the result of the AND operation is "1101".

The supervisory/maintenance information combining unit 12 outputs, as supervisory/maintenance information in which the maintenance information and the supervisory information are combined together, "1101" to the digital multiplexed transmission path 6 (step S7). The supervisory/maintenance information "1101" is received by the controller 20 of the host exchange 4 (step S12 shown in FIG. 6). The supervisory/maintenance information extracting unit 21 of the controller 20 outputs the supervisory/maintenance information to the connection processing unit 22. The connection processing unit 22 can determine, by referring to the two high-order bits a and b of the supervisory/maintenance information, whether the mate-exchange subscriber terminal 5 is held in the on-hook state or off-hook state.

Further, the connection processing unit 22 determines, by referring to the two low-order bits c and d of the supervisory/maintenance information, whether or not a fault or blocked state has occurred. In the example being considered, it is confirmed that a fault has occurred in a part of the remote-exchange system 1 regarding the subscriber terminal 5. When the occurrence of a fault is confirmed, the connection processing unit 22 stores, in a storage area of a built-in memory or a memory connected thereto for storing information concerning the states of remote-exchange subscriber terminals, information indicating that a connection to the subscriber terminal 5 cannot be made due to a fault. Such information is, for example, flags provided for respective mate-exchange subscriber terminals. For example, the flag relating to the subscriber terminal 5 is turned ON when the occurrence of a fault therein is confirmed.

Further, the supervisory/maintenance information extracting unit 21 sends the extracted maintenance information to the maintenance information notification unit 23, which analyzes the received maintenance information and edits it, thereby producing information readable by the maintenance person on the basis of the analyzed result. The edited information is sent to the maintenance console 28 via the maintenance interface 27. Thereby, information concerning the fault that has occurred in the subscriber terminal 5 is displayed on the maintenance console 28 (step S13). The maintenance person belonging to the host-exchange system 2 can know of the occurrence of a fault in the subscriber terminal 5 (step S14).

If a call addressed to the mate-exchange subscriber terminal 5 is received in the above-mentioned state (step S15), the connection processing unit 22 confirms, by referring to the information (flag) stored in the above-mentioned storage area, that a fault has occurred in the subscriber terminal 5, and connects a talkie device 41 to the calling subscriber terminal via the speech communications path 25 (step S16), so that a talkie message indicating that the calling subscriber terminal is down and a connection thereto is not available is sent to the calling subscriber terminal.

A description will now be given, with reference to FIG. 7, of an operation of the embodiment being considered in which a connection to the subscriber terminal 5 has been blocked because, for example, a corresponding package accommodating the corresponding subscriber circuit 14 requires replacement by a new one. The operations up to steps S21 and S31 are the same as those up to steps S1 and S11 shown in FIG. 6.

In step S22, blocking information is input by the maintenance console 18 in order to, for example, replace the subscriber circuit 14 with a new one. The blocking information is received by the maintenance information collecting unit 11 via the maintenance interface 17 in step S23.

The blocking information is sent to the connection processing unit 13 from the maintenance information collecting unit 11 and stored therein. If a call addressed to the subscriber terminal 5 is received by the connection processing unit 13 in the above blocked state, the connection processing unit 13 does not make a connection to the terminal 5. Further, the blocking information is sent to the host-exchange system 2 in order to prevent the host-exchange system 2 from calling the subscriber terminal 5 as follows.

The maintenance information collecting unit 11 generates maintenance information from the blocking information. The four bits of the maintenance information used in the case of blocking are "1110" as indicated in part (5) of FIG. 2. In order to transmit the maintenance information using the time slot in which the supervisory information concerning the blocked subscriber circuit 14 is transmitted, the unit 11 calculates the timing of the above time slot (steps S24 and S25). When the current time corresponds to the calculated timing of the time slot, the maintenance information collecting unit 11 sends the maintenance information to the supervisory/maintenance information combining unit 12, which performs an AND operation on the received maintenance information and the supervisory information (step S26). In this case, the result of the AND operation is "1110", and is transmitted, as the supervisory/maintenance information, to the host-exchange system 2 (step S27).

The supervisory/maintenance information extracting unit 21 of the controller 20 extracts the supervisory/maintenance information from the supervisory information transmission range, and outputs it to the connection processing unit 22 (S32). The connection processing unit 22 determines, by referring to the two high-order bits a and b of the supervisory/maintenance information, whether the subscriber terminal 5 is in the on-hook state or the off-hook state, and confirms the blocking state by referring to the two low-order bits c and d of the supervisory/maintenance information. In the example being considered, the subscriber terminal 5 is in the blocked state, and the connection processing unit 22 stores information indicating that the subscriber terminal 5 is in the blocked state (step S34).

The supervisory/maintenance information extracting unit 21 sends the extracted maintenance information to the maintenance information notification unit 23, which outputs the received information to the maintenance console 28 via the maintenance interface 27. Information indicating that the subscriber terminal 5 is in the blocked state is displayed on the maintenance console 28 (step S33).

If a call addressed to the subscriber terminal 5 is received in the above state (step S35), the connection processing unit 22 of the host exchange 4 knows that the subscriber terminal 5 is in the blocked state, and sends a busy tone to the calling subscriber terminal in order to inform the calling terminal that a connection to the called terminal is impossible (step S36).

According to the above-mentioned embodiment of the present invention, the host-exchange system 2 does not make a connection to the remote-exchange subscriber terminal 5 in a case where a fault has occurred in the mate-exchange subscriber circuit 14 or the subscriber terminal 5 is in the blocked state. Hence, the calling subscriber does not waste time.

The above description relates to a case where a fault has occurred in the subscriber circuit 14 and the subscriber terminal 5 is blocked. Further, the embodiment of the present invention can operate in the same manner as described previously if a fault has occurred in parts of the system 1 regarding a connection to the subscriber terminal 5, for example, the digital termination unit 19. In this case, information concerning a fault that has occurred in the digital termination unit 19 is sent to the maintenance information collecting unit 11 via a line (not shown in FIG. 4 for the sake of simplicity). Then, the above information concerning a fault that has occurred in the unit 19 is sent to the host-exchange system 2 together with the supervisory information concerning the subscriber terminal 5. Hence, the host exchange 4 can know that a connection to the subscriber terminal 5 is impossible, so that the calling subscriber does not waste time.

Various variations and modification of the embodiment of the present invention may be made. For example, the digital multiplexed transmission path 6 is not limited to 32 time slots. The maintenance information and the supervisory information are not limited to four bits. Further, a semi-fixed connection can be employed under the control of the host exchange 4 and the remote exchange 2 when the subscriber terminal 5 is switched to the off-hook state and the host-exchange system 2 makes a connection to the subscriber terminal 5. This variation is different from the aforementioned embodiment in that the subscriber terminal 5 is not always connected to the host-exchange system 2 via the digital multiplexed transmission path 6.

In the aforementioned embodiment of the present invention, the remote-exchange system 1 and the host-exchange system are directly connected together via the digital multiplexed transmission path 6. Alternatively, a relay exchange may be provided in the path 6. Further, in the aforementioned embodiment, a talkie announcement is sent when a fault has occurred in the circuit 14, and a busy tone is sent when the terminal 5 is in the blocked state. Alternatively, it is possible to send a talkie announcement to the calling terminal when the terminal 5 is in the blocked state. Further, it is possible to use sound signals generated by sound sources, these sound signals respectively corresponding to the occurrence of a fault and the blocked state and being distinguishable therebetween. Furthermore, the remote-exchange system 1 and the host-exchange system 2 are not limited to those shown in the previously described figures.

The present invention is not limited to the specifically disclosed embodiments, variations and modifications, and other variations and modifications may be made without departing from the scope of the present invention.

What is claimed is:

1. A communication system comprising:

a first exchange system having a first exchange accommodating a first exchange subscriber terminal;

a second exchange system having a second exchange physically accommodating a second exchange subscriber terminal; and a communications medium connecting the first exchange system and the second exchange system together, said second exchange system comprising:

first means for collecting maintenance information in order to determine whether or not the second exchange subscriber terminal is in an operating state; and second means for sending the maintenance information to the first exchange system via a transmission range allotted to the second exchange subscriber terminal on the communications medium, said first exchange system comprising third means for monitoring a state of the second exchange subscriber terminal on the basis of the maintenance information from the second means of said second exchange system and for controlling a call addressed to the second exchange subscriber terminal.

2. The communications system as claimed in claim 1, wherein said first means comprises fourth means for determining whether or not the second-exchange subscriber terminal is in a blocked state.

3. The communications system as claimed in claim 1, wherein:

the second exchange system comprises a subscriber circuit connecting the second exchange subscriber terminal and the second exchange together; and said first means comprises fourth means for determining whether or not a fault has occurred in the subscriber circuit.

4. The communications system as claimed in claim 1, wherein said second means comprises fourth means for combining the maintenance information with supervisory information concerning the second-exchange subscriber terminal and for sending combined information containing the supervisory information and the maintenance information to the first-exchange system.

5. The communications system as claimed in claim 1, wherein:

the communications medium has a plurality of time slots that are multiplexed on a time basis; and said second means comprises fourth means for sending the maintenance information to the first-exchange system via a predetermined one of the time slots allotted to the second-exchange subscriber terminal on the communications medium.

6. The communications system as claimed in claim 1, wherein said third means comprises fourth means for sending a predetermined signal to a terminal station that generates said call, said predetermined signal indicating that a connection to the second-exchange subscriber terminal cannot be made.

7. The communications system as claimed in claim 1, wherein said first-exchange system comprises fourth means for outputting the maintenance information to an outputting device.

8. The communications system as claimed in claim 1, wherein:

said first means comprises fourth means for determining whether or not the second exchange subscriber terminal is in a blocked state;

the second exchange system comprises a subscriber circuit connecting the second exchange subscriber terminal and the second exchange together;

said first means comprises fifth means for determining whether or not a fault has occurred in the subscriber circuit;

said second means comprises sixth means for combining the maintenance information with supervisory information concerning the second exchange subscriber terminal and for sending combined information containing the supervisory information and the maintenance information to the first exchange system.

9. A method for managing a remote exchange subscriber terminal accommodated in a remote exchange of a remote exchange system connected to a host exchange of a host-exchange system via a communications medium, said method comprising:

(a) collecting, in the remote exchange system, maintenance information to determine as to whether or not the remote exchange subscriber terminal is in an operating state;

(b) sending the maintenance information to the host-exchange system via a transmission range allotted to the remote exchange subscriber terminal on the communications medium;

(c) monitoring, in the host-exchange system, a state of the remote exchange subscriber terminal on the basis of said maintenance information; and (d) controlling, in the host-exchange system, a call addressed to the remote exchange subscriber terminal.

10. The method as claimed in claim 9, wherein said step (a) comprises the step of determining whether or not the remote-exchange subscriber terminal is in a blocked state.

11. The method as claimed in claim 9, wherein said step (a) comprises the step of determining whether or not a fault has occurred in a subscriber circuit connecting the remote-exchange subscriber terminal and the remote exchange together.

12. The method as claimed in claim 9, wherein said step (b) comprises the step of combining the maintenance information with supervisory information concerning the remote-exchange subscriber terminal and for sending combined information containing the supervisory information and the maintenance information to the host-exchange system.

13. The method as claimed in claim 9, wherein:

the communications medium has a plurality of time slots that are multiplexed on a time basis; and said step (b) comprises the step of sending the maintenance information to the host-exchange system via a predetermined one of the time slots allotted to the remote-exchange subscriber terminal on the communications medium.

14. The method as claimed in claim 9, wherein said step (c) comprises the step of sending a predetermined signal to a terminal station that generates said call, said predetermined signal indicating that a connection to the remote-exchange subscriber terminal cannot be made.

15. The method as claimed in claim 9, wherein said method comprises the step of outputting the maintenance information to an outputting device.

16. The method as claimed in claim 9, wherein:

said step (a) comprises the steps of:

determining whether or not the remote exchange subscriber terminal is in a blocked state;

determining whether or not a fault has occurred in a subscriber circuit connecting the remote exchange subscriber terminal and the remote exchange together, and said step (b) comprises the steps of:

combining the maintenance information with supervisory information concerning the remote exchange subscriber terminal; and sending combined information containing the supervisory information and the maintenance information to the host-exchange system.

* * * * *